United States Patent
Lesartre et al.

(10) Patent No.: US 10,248,571 B2
(45) Date of Patent: Apr. 2, 2019

(54) SAVING POSITION OF A WEAR LEVEL ROTATION

(71) Applicant: HEWLETT PACKARD ENTERPRISE DEVELOPMENT LP, Houston, TX (US)

(72) Inventors: Gregg B. Lesartre, Fort Collins, CO (US); Harvey Ray, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/234,982

(22) Filed: Aug. 11, 2016

(65) Prior Publication Data

US 2018/0046576 A1 Feb. 15, 2018

(51) Int. Cl.
  *G06F 12/02* (2006.01)
  *G06F 12/0893* (2016.01)

(52) U.S. Cl.
  CPC ...... *G06F 12/0893* (2013.01); *G06F 12/0246* (2013.01); *G06F 2212/1036* (2013.01); *G06F 2212/60* (2013.01); *G06F 2212/7211* (2013.01)

(58) Field of Classification Search
  USPC .......................................................... 711/118
  See application file for complete search history.

(56) References Cited

U.S. PATENT DOCUMENTS

| 2004/0083335 | A1* | 4/2004 | Gonzalez ............ G06F 12/0246 711/103 |
| 2011/0093654 | A1* | 4/2011 | Roberts ................ G06F 1/3203 711/105 |
| 2011/0191523 | A1* | 8/2011 | Caulkins ............. G06F 12/0868 711/103 |
| 2011/0307665 | A1* | 12/2011 | Rudelic ................. G06F 12/084 711/130 |
| 2012/0117304 | A1* | 5/2012 | Worthington ....... G06F 12/0223 711/103 |
| 2014/0095956 | A1* | 4/2014 | Ozdemir ............. G06F 11/1048 714/755 |

(Continued)

OTHER PUBLICATIONS

Qureshi et al., "Enhancing Lifetime and Security of PCM-Based Main Memory with Start-Gap Wear Leveling," MICRO'09, Dec. 2009, pp. 14-23.

*Primary Examiner* — Mano Padmanabhan
*Assistant Examiner* — Jean C Edouard
(74) *Attorney, Agent, or Firm* — Hewlett Packard Enterprise Patent Department

(57) ABSTRACT

In one example in accordance with the present disclosure, a system may include a wear level handler to start a current rotation of a wear level algorithm through a plurality of cache line addresses in a region of memory and a location storer to store a rotation count of the rotation. The system may also include a data mover to move a cache line from the selected cache line address to a gap cache line address corresponding to the additional cache line address and a metadata setter to set a metadata of the gap cache line address to a value corresponding to the current rotation. The system may also include a current position determiner to determine, based on the value of at least one metadata and the rotation count, a current position of the current rotation after a power loss event.

17 Claims, 5 Drawing Sheets

(56) References Cited

U.S. PATENT DOCUMENTS

| | | | |
|---|---|---|---|
| 2014/0181377 A1* | 6/2014 | Kimmel | G06F 12/0246 711/103 |
| 2014/0208005 A1* | 7/2014 | Simionescu | G06F 12/0804 711/103 |
| 2014/0237160 A1* | 8/2014 | Dong | G06F 12/0864 711/102 |
| 2014/0244897 A1* | 8/2014 | Goss | G06F 12/0246 711/103 |
| 2016/0147467 A1* | 5/2016 | Roberts | G06F 12/0238 711/103 |
| 2016/0203085 A1* | 7/2016 | Kranich | G06F 12/0802 713/2 |
| 2016/0299850 A1* | 10/2016 | Budiman | G06F 3/06 |

* cited by examiner

SAVING POSITION OF A WEAR LEVEL ROTATION

BACKGROUND

Non-volatile memories (NVM) with relatively short endurance lifetimes may use wear-level algorithms to enhance the lifetime of the NVM. The state of this algorithm may be saved across power cycles so the location of the data can be unscrambled.

BRIEF DESCRIPTION OF THE DRAWINGS

The following detailed description references the drawings, wherein.

DETAILED DESCRIPTION

Figure 1A:
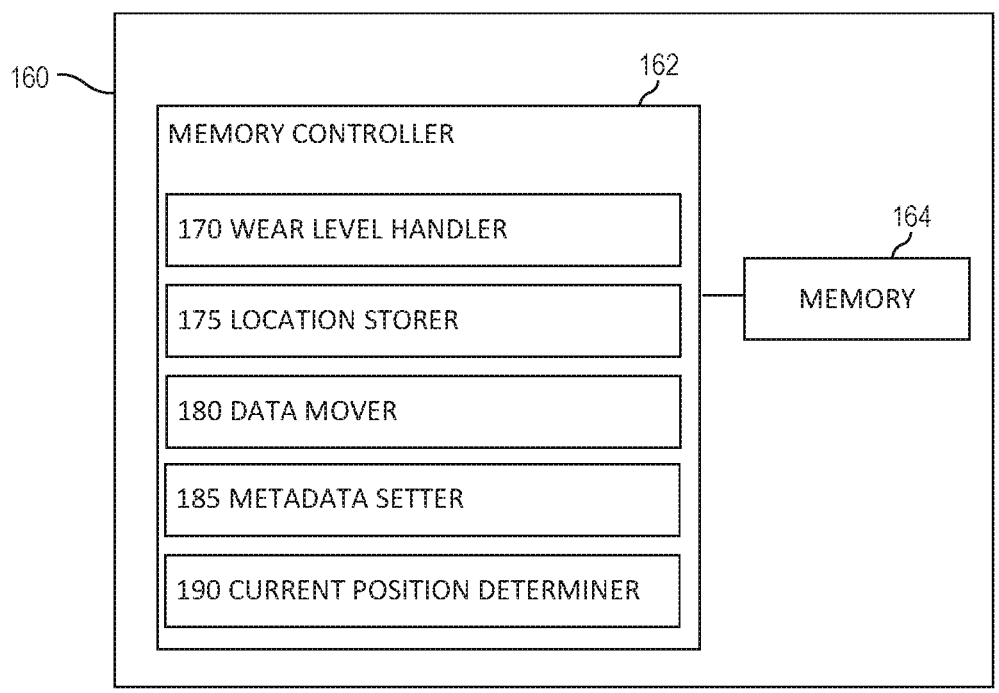
FIG. 1A is a block diagram of an example system for saving position of a wear level rotation.

Wear-level algorithms may be applied so that writes to a NVM are evenly spread across the available memory address range. These algorithms may move data around over time to avoid "hot-spots" that could cause portions of the memory to wear-out prematurely. For example, a wear level algorithm may divide a NVM into regions and move data to different cache line addresses in the region. A translation function may be maintained throughout that defines how the data is distributed in memory. Since the memory is non-volatile, the expectation may be that data is available across power cycles. Therefore if power is removed, either under controlled circumstances, or due to a power failure or system component failure, the current translation should be preserved as well as the data.

Traditional systems may provide sufficient capacitance to allow saving state after power is lost. Memories accessing larger blocks of data, such as flash storage, may save state each time data is relocated into non-volatile storage. When memory is accessed in smaller quantities, such as cache lines, and at processor frequencies, data relocation may be most effective if done at a higher rate. If the translation save to memory is done at a rate to match memory writes, too much power and performance may be sacrificed in order to maintain the state in memory on the fly. In addition, this high frequency of updates may result in wear out of the NVM used to hold the current translation state, the very problem which the wear state algorithm may be used to prevent.

Systems and methods for saving position of a wear level rotation described herein provide a mechanism to retain the current state of the wear level rotation through a plurality of cache line addresses proactively rather than saving the translation after power is known to be failing. The systems and methods for saving position of a wear level rotation may utilize a rotation count corresponding to the number of rotations of the wear level rotation and a gap pointer corresponding to progress of the wear level rotation. The rotation count may be saved each time a full rotation of the wear level rotation is complete. Rather than save the gap pointer each time a cache line address is rotated, metadata may be stored with each cache line address. After a power loss event, this metadata and the rotation count may be used to reconstruct the gap pointer and thus determine the current position of the wear level rotation.

The system and methods may not maintain power to the memory by battery or capacitance for retaining the current state as power fails. Additionally, the techniques discussed herein may remove the risk that a failure to maintain power during this period results in the loss of the translation function, and thus an effective loss of all data on the memory. Moreover, the systems and methods for saving position of a wear level rotation described herein provide a mechanism that may save a minimal amount of data to recover the current state of the wear level algorithm in order to reduce the amount of power and performance used in saving the state and prevent the premature expiration of the NVM.

An example system for saving position of a wear level rotation may include a wear level handler to start a current rotation of a wear level algorithm through a plurality of cache line addresses in a region of memory. The system may include a location storer to store a rotation count of the rotation corresponding to a cache line address belonging to the plurality and a data mover to move a cache line from the selected cache line address to a gap cache line address corresponding to the additional cache line address. The system may include a metadata setter to set a metadata of the gap cache line address to a value corresponding to the current rotation, wherein the first cache line address becomes the current gap cache line address after the data has been copied and the metadata has been set. The system may also include a current position determiner to determine, based on the value of at least one metadata and the rotation count, a current position of the current rotation after a power loss event.

FIG. 1A is a block diagram of an example system 160 for saving position of a wear level rotation. System 160 may include a memory controller 162 that manages memory 164. Memory controller 162 is digital circuit that manages data going into an out of a memory. Memory controller 162 may be integrated into another chip of system 160 or may be a discrete chip. Memory 164 may include a non-volatile memory that can retain content when the power is off. Non-volatile memory may be a Phase change memory (PCM), a memristor memory, FLASH memory, or other non-volatile memory needing wear leveling to overcome memory endurance limitations Memory controller 162 may include wear level handler 170, location storer 175, data mover 180, metadata setter 185, current position determiner 190, and/or other components to implement the steps of the system and methods described. In some aspects, these steps may be executed by the hardware of the memory controller. In some aspects, these steps may be achieved by executing instructions in a processor that is part of the memory controller. Accordingly, system 160 may be implemented in hardware and/or a combination of hardware and programming that configures hardware. Furthermore, in FIG. 1A and other Figures described herein, different numbers of components or entities than depicted may be used.

Memory controller 162 may execute steps of wear level handler 170 to start a current rotation of a wear level algorithm through a plurality of cache line addresses in a region of memory. Specifically, the wear level algorithm may move cache line data from one cache line address in the plurality to a different cache line address in the plurality, and so on. The region of memory may include space to store each cache line assigned to the region and an additional cache line. The additional cache line may be referred to as a gap cache line. A start-gap wear level algorithm executed by wear level algorithm 170 may logically divide a non-volatile memory into regions.

Figure 1B:
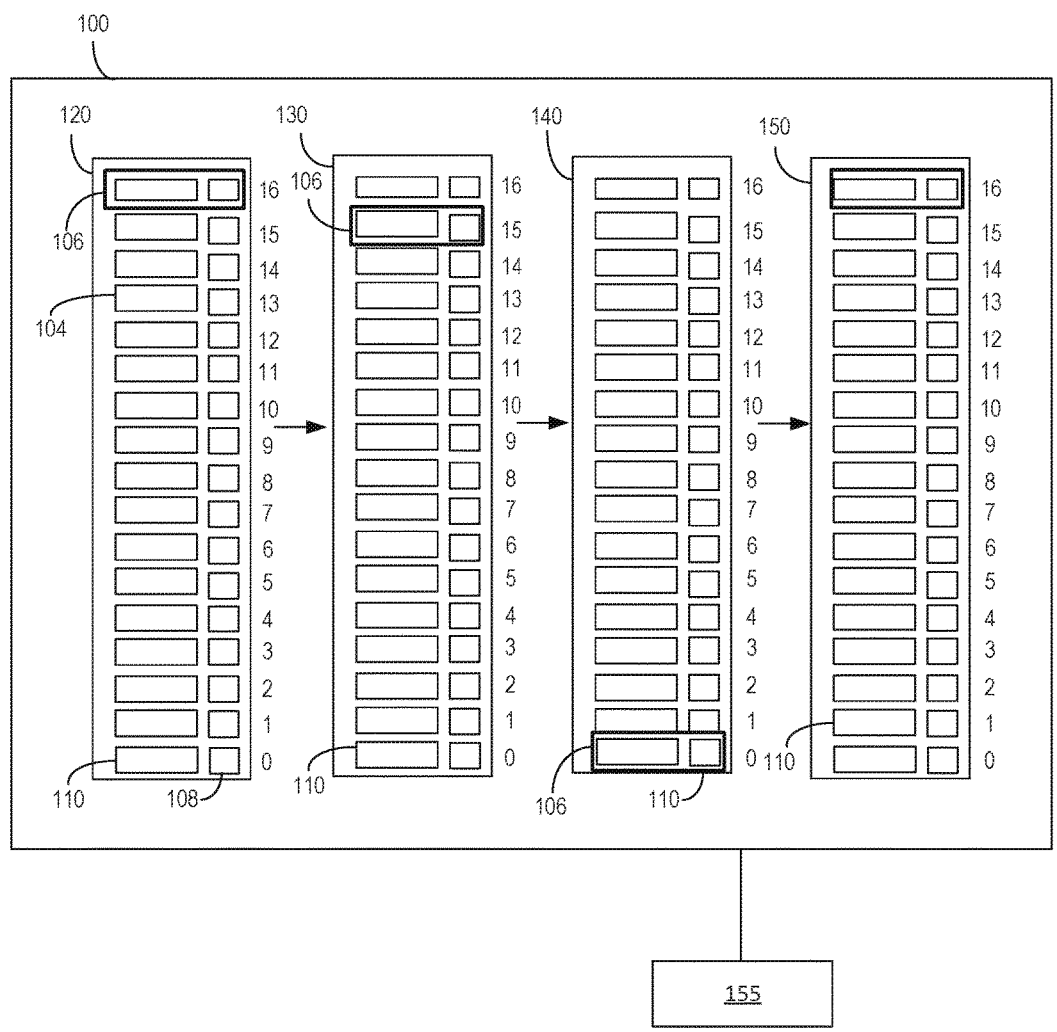
FIG. 1B is a block diagram of an example memory region in which a system for saving position of a wear level rotation may be useful.

FIG. 1B is an example memory region 100 of memory 164. Memory region 100 may reside in a non-volatile memory that can retain content when the power is off. Non-volatile memory may be a Phase change memory (PCM), a memristor memory, FLASH memory, or other non-volatile memory needing wear leveling to overcome memory endurance limitations. Memory controller 162 may include operation of wear level handler 170 to track activity in region 100 and rotate addresses in the region 100 over time to distribute memory wear.

Region 100 may have space to store all cache lines assigned to that region plus one additional cache line. The extra cache line at any given time may be referred to as a "gap cache line." The example memory region 100 of FIG. 1B includes 16 cache lines 104 (labeled 0-15) and a gap cache line 106 (labeled 16).

Memory region 100 may include a rotation count 110 of the number of rotations of the wear level algorithm. The rotation count 110 may be used to track the total number of times that each cache line 104 in memory region 100 has been relocated. Relocation of cache lines 104 in memory region 100 will be discussed in further detail below. The rotation count 110 may be represented by one cache line 104 in memory region 100, such as the first cache line in the memory region. In FIG. 1B, the rotation count 110 is cache line 0. A rotation count may be used to track the number of rotations performed on a memory region. Rotation count storer 175 may store the rotation count in a dedicated location in non-wear leveled NVM. Importantly, the rotation count may be stored outside of memory region 100. From the rotation count, the current location of the first cache line in the region may be determined. Any number of algorithms may be used to determine a memory address for the first cache line from the rotation count. The first entry may be determine by adding the rotation count to the first address of the memory region. Alternatively the current address may be determined by applying a hash function of the rotation count ad first address in a fashion such that each rotation count results in a unique current address for the first cache line current rotation. The first cache line rotation count may correspond to a first cache line belonging to the plurality of cache lines. The rotation count may be stored on a different portion of a memory that includes memory region 100, a separate memory, etc. The rotation count may indicate a number of complete rotations of the wear level algorithm.

Memory controller 162 may execute steps of wear level handler 170 to complete the current rotation through the plurality of cache lines and start a second rotation through the plurality of cache lines. Memory controller 162 may execute steps of rotation count storer 175 to increment the rotation count and store the rotation count to a memory location 155. Although in the example described, two rotations occur, other number of rotations through the region 100 may occur.

Memory controller 162 may execute steps of data mover 180 to move a cache line from the selected cache line address to a gap cache line address. Specifically, data mover 180 may rotate through the cache lines 104 in region 100 and, for each cache line, select the cache line and copying data from the selected cache line to a current gap cache line. For example, every n writes to the region 100, one cache line 104 may be relocated to a gap cache line 106, freeing its old location to be the new gap cache line 106.

Each cache line 104 may also include metadata 108 used for determining a current position of the rotation through the region 100 of memory. The metadata 108 may provide enough information to reconstruct the gap pointer. The metadata 108 may be, for example, an extra bit stored with data of a cache line 104. Memory controller 162 may execute steps of metadata setter 185 to set a metadata of the gap cache line address to a value corresponding to the current rotation. The first cache line address may become the current gap cache line address after the data has been copied and the metadata has been set.

For example, the wear level algorithm may alternate between an even rotation and an odd rotation and the metadata may be a bit stored with data of each cache line. The even rotation may be characterized by a first value of the bit and the odd rotation may be characterized by a second value of the bit. Memory controller 162 may execute steps of metadata setter 185 to set the value of the bit to the first value if the current rotation is the even rotation and to set the value of the bit to second value if the current rotation is the odd rotation. Each time a cache line is written to the gap location (freeing up a new gap), the bit written with that cache line may be updated to the current Even/Odd status. In this manner, information to recover the gap pointer is left each time the gap pointer is updated.

The dedicated memory location 155 storing the rotation count may also include a reference metadata value. Memory controller 162 may execute steps of metadata setter 185 may set a reference metadata in memory location #155 corresponding to the rotation count to the value corresponding to the current rotation. Memory location 155 may be part of memory 164 or may be part of a separate memory. Memory controller 162 may execute steps of location storer 175 to store a rotation count of the rotation. The rotation count may correspond to a cache line address belonging to the plurality. Location storer 175 may store the reference metadata with the location of the rotation count. Alternatively the reference metadata may be determined algorithmically from the rotation count value.

A gap pointer may reference the location of gap cache line 106, corresponding to the progress of the rotation of the wear level algorithm through the cache lines 104 of region 100. Once all of the cache lines 104 in a region 100 have relocated and thus the rotation is complete, the rotation count 110 may be updated and the next rotation through the region 100 may be started. As discussed above, the rotation count 110 may be used to track the total number of times that each cache line 104 in memory region 100 has been replicated. Once the rotation is complete, the rotation count 110 may be incremented. For example, if the rotation count corresponds to the location of a first cache line 0, the rotation count may be incremented when the location of the first cache line 0 is moved from cache line address 0 to cache line address 1. Similarly, after a second rotation the rotation count may be incremented when cache line 0 moves from cache line address 1 to cache line address 2, etc.

The current rotation count and the current gap pointer may be used to define the current translation for each region. Rather than save the rotation count and gap pointer once a power loss is recognized, memory controller 162 may execute steps of location storer 175 to save the rotation count each time the rotation count is incremented (i.e. changes to a defined NVM location). For example, the rotation count may change every (n*(region size)) writes. Saving the rotation count at this infrequent interval may not significantly negatively affect performance or to wear out the memory location where the rotation count is saved. Memory controller 162 may execute steps of location storer 175 to save the rotation count by saving the rotation counter to memory.

FIG. 1B illustrates four different states of region 100: state 120, state 130, state 140 and state 150. State 120 illustrates an initial state of the memory region 200 with the gap cache line 106 occupying the extra cache line 16. State 130 may illustrate a second state of the memory region 100 after the data contained in a cache line 15 is relocated to the gap cache line 106, freeing its old location (cache line 16) to be the new gap cache line 106. As described above, the wear level algorithm may rotate each cache line 104 in region 100 until all data in region 100 has been moved once. State 140 illustrates when a current rotation through the region 100 is complete. As shown in FIG. 1B, gap cache line 106 is now located at cache line 0 (the rotation count 110 of the wear level algorithm). State 150 illustrates the beginning of a second rotation of a wear level algorithm, where the rotation count 110 is changed to cache line address 1 and the gap cache line 106 once again occupies cache line 16. As described above, cache line data is moved around from cache line address to cache line address, so the rotation pointer corresponds to the current location of cache line 0 (in this case in cache line address 1 after one rotation).

In some aspects, at least one cache line 104 in memory region 100 may not be rotated. For example, a cache line 104 may already be worn out due to prior use, or may have manufacturing defects, etc. In these aspects, an alternate cache line address may be provided by a memory controller. In such a circumstance, the remaining usable bits in the cache line 104 may be used to maintain a remap pointer to an alternate cache line address in order to remap the location. When the wear level rotation reaches a cache line that has been remapped, it will not move the remap pointer to the gap. Instead it will follow the pointer to the alternative location, access the cache line found there, and move the alternative location's cache line to the gap. The alternative location then becomes the new gap. Later, when the next cache line is rotated into the gap, it is placed in this alternative location. The memory address containing the remap pointer is not modified in this sequence.

At any point power may be lost (intentionally, due to system maintenance, etc., or unintentionally, due to a power fail, component fail). In system 100, the state of the rotation may not be saved when a power loss event occurs. For example, system 100 may recognize a power loss event and the reference and gap pointer (including the location of the gap cache line) may not be saved upon recognition of the power loss event. Instead, the metadata 108 and rotation count 110 (which has already been saved as described above) may be used to reconstruct the gap pointer, after power has been restored. As described above, the gap pointer may correspond to the correct state of rotation once power is resupplied. Current position determiner 190 may retrieve the rotation count 110. The rotation count may be retrieved from a non-volatile memory, such as the memory including the region 100. Current position determiner 190 may determine, based on the value of at least one metadata and the rotation count, a current position of the current rotation after a power loss event. Current position determiner 190 may determine the current position of the current rotation by identifying a first adjacent cache line containing a first metadata with the value corresponding to the current rotation and a second adjacent cache line containing a second metadata a value that does not correspond to the current rotation.

The gap pointer may be determined by examining the state of the meta-data in each region. This may be done through, for example, a binary search algorithm. Current position determiner 190 may determine the value of the current location of the gap pointer by first determining the value of metadata 108 of the rotation count 110. Current position determiner 190 may identify the cache line 104 midway through region 100 and determine the value of the corresponding metadata 108. If the value of the metadata 108 matches the value of the current rotation then a higher region of addresses (i.e. between the midpoint and the first memory address of the region) may next be checked. If the value of the metadata does not match the value of the current rotation, then a lower region of addresses (i.e. between the midpoint and the last memory address of the region) may be checked.

Current position determiner 190 may then determine the value of the metadata 108 of the address midway between the first address and the lower or higher address range and a similar determination made. Current position determiner 190 may continue narrowing down the region by examining the value of the metadata of the midway address range in this manner until current position determiner 190 identifies a first adjacent cache line containing a first metadata with the value corresponding to the current rotation and a second adjacent cache line containing a second metadata a value that does not correspond to the current rotation. The current position of the rotation is first adjacent cache line containing the first metadata with the value corresponding to the current rotation. In this fashion, the correct gap pointer may be rediscovered in m checks where the region size is $2^m$ in size.

In some aspects, rather than search the entire region 100, the current position determiner 190 may search through smaller sub regions of region 100. For example, the memory may include a plurality of sub regions. The rotation count may be saved for a given sub region based on some criteria. For example, the rotation count of the sub region may be saved periodically, each time a quarter rotation has occurred, each time the cache lines in the sub region have been relocated, etc. After a power loss event the sub-region containing the gap cache line may be identified by examining the rotation count and the value corresponding to the current rotation may be determined based on the value of the gap point of the rotation count. Current position determiner 190 may perform the binary search algorithm, as described above, on the sub-region. In this manner, it may be determined which portion of the region contains the gap cache line and that portion of the region is searched instead of the entire region. This may reduce the time and computation required to perform the search.

Figure 2:
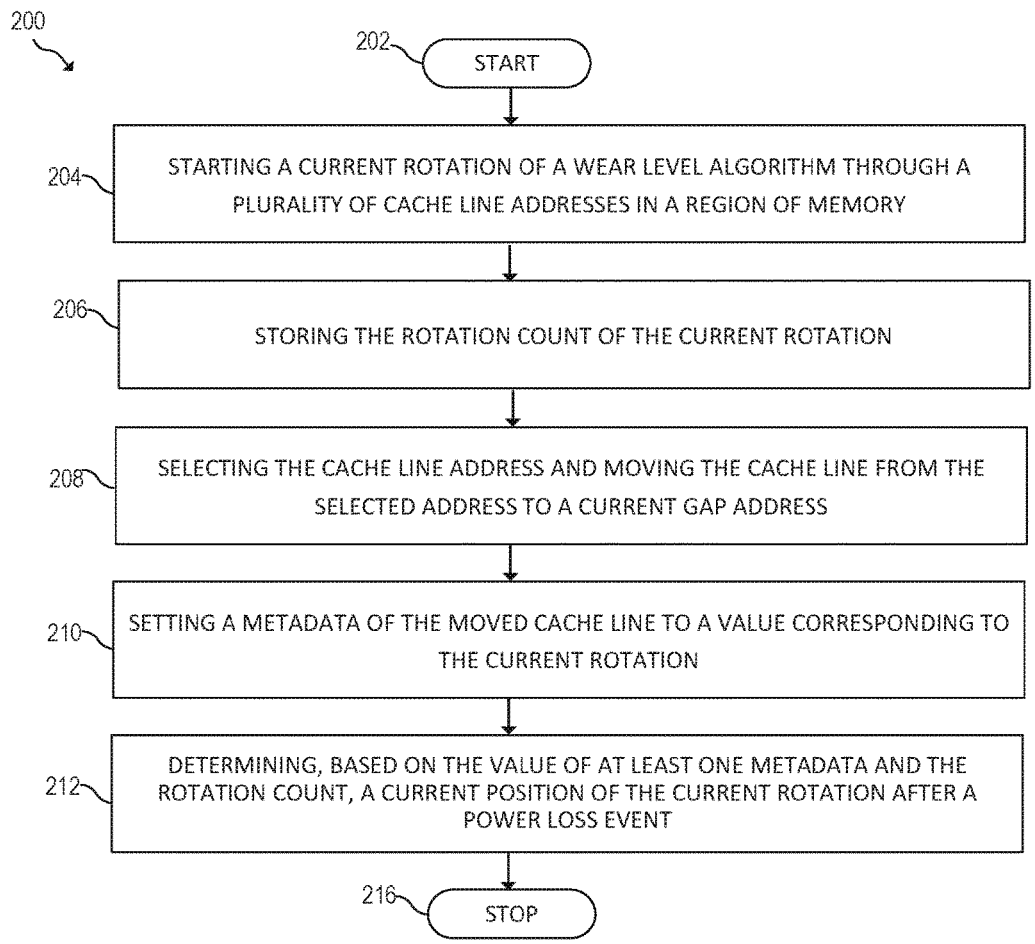
FIG. 2 is a flowchart of an example method for saving position of a wear level rotation.

FIG. 2 is a flowchart of an example method 200 for saving position of a wear level rotation. Method 200 may be described below as being executed or performed by a system, for example, system 100 of FIG. 1A or system 400 of FIG. 4. Other suitable systems and/or computing devices may be used as well. Method 200 may be implemented in the form of electronic circuitry (e.g., hardware), such as a memory controller. Method 200 may be implemented by executing instructions in a processor that is part of the memory controller. Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat.

Method 200 may start at block 202, and may continue to block 204, where the method may include starting a current rotation of a wear level algorithm through a plurality of cache line addresses in a region of memory. The wear level algorithm may alternate between an even rotation and an odd rotation. The even rotation may be characterized by a first value of the metadata and the odd rotation may be characterized by a second value of the metadata. The method may include setting the value of the metadata to the first value if the current rotation is the even rotation and setting the value of the metadata to second value if the current rotation is the odd rotation. At block 206, the method may include storing a rotation count of the current rotation, wherein the rotation count corresponds to a cache line belonging to the plurality. At block 208, for each cache line in the plurality, the method may include selecting the cache line address and moving the cache line from the selected address to a current gap address. At block 210, the method may include setting a metadata of the moved cache line to a value corresponding to the current rotation. The selected cache line address may become the current gap cache line address after the data has been copied and the metadata has been set. At block 212, the method may include determining, based on the value of at least one metadata and the rotation count, a current position of the current rotation after a power loss event. Method 200 may eventually continue to block 214, where method 200 may stop.

Figure 3:
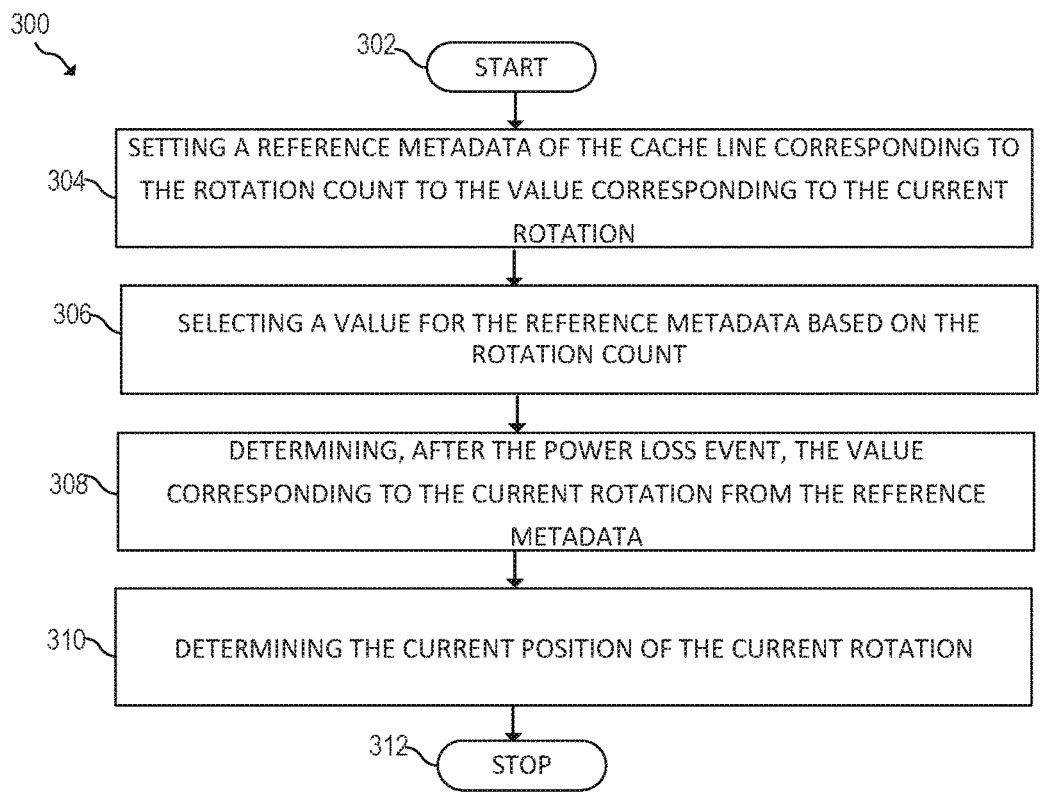
FIG. 3 is a flowchart of an example method for determining position of a wear level rotation.

FIG. 3 is a flowchart of an example method 300 for determining the position of a wear level rotation. Method 300 may be described below as being executed or performed by a system, for example, system 100 of FIG. 1A or system 400 of FIG. 4. Other suitable systems and/or computing devices may be used as well. Method 300 may be implemented in the form of electronic circuitry (e.g., hardware), such as a memory controller. Method 300 may be implemented by executing instructions in a processor that is part of the memory controller. Method 300 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. At least one block of method 300 may be executed substantially concurrently or in a different order than shown in FIG. 3. Method 300 may include more or less blocks than are shown in FIG. 3. Some of the blocks of method 300 may, at certain times, be ongoing and/or may repeat.

Method 300 may start at block 302, and continue to block 304, where the method may include setting a reference metadata of the cache line corresponding to the rotation count to the value corresponding to the current rotation. At step 306, the method may include selecting a value fr the reference metadata based on the rotation count. At step 308, the method may include determining, after the power loss event, the value corresponding to the first rotation from the reference metadata. At step 310, the method may include determining the current position of the current rotation by identifying a first adjacent cache line containing a first metadata with the value corresponding to the current rotation and a second adjacent cache line containing a second metadata a value that does not correspond to the current rotation. Method 300 may use, for example, a binary search algorithm, to determine the current position as described in step 308. Method 300, may determine the current position of the current rotation by reconstructing a gap pointer using the rotation count and the metadata. Method 300 may eventually continue to block 312, where method 300 may stop.

Figure 4:
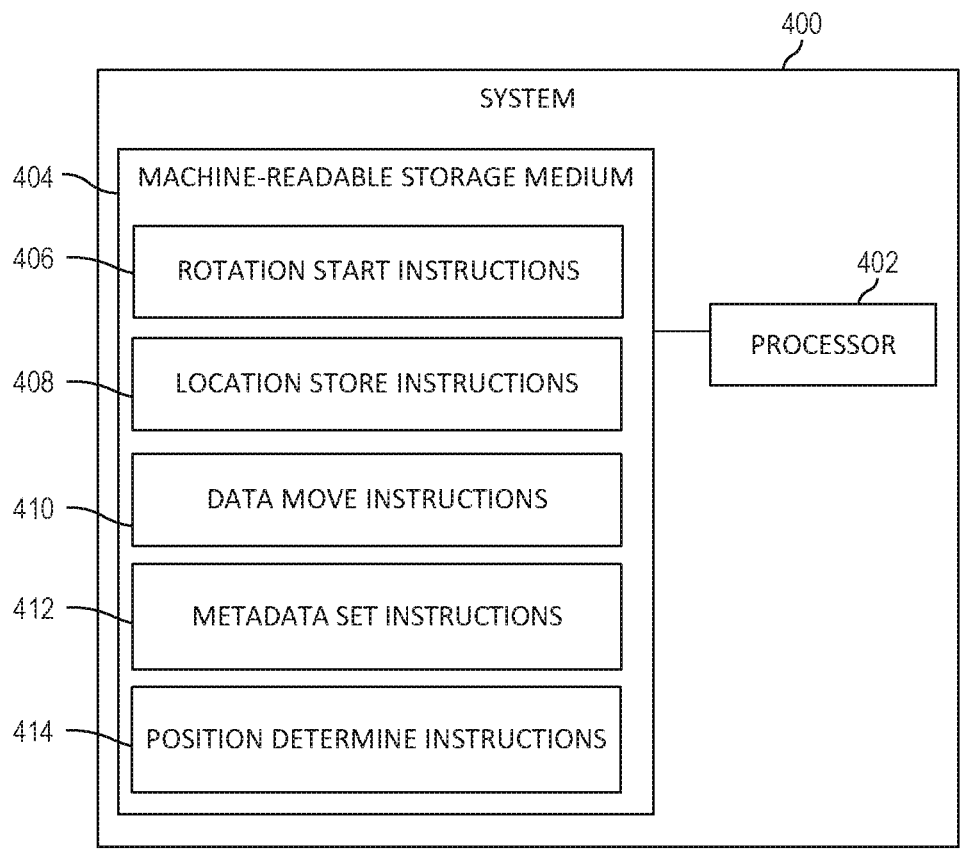
FIG. 4 is a block diagram of an example system for saving position of a wear level rotation.

FIG. 4 is a block diagram of an example system 400 for saving position of a wear level rotation. System 400 may be similar to system 100 of FIG. 1A, for example. In the example illustrated in FIG. 4, system 400 includes a processor 402 and a machine-readable storage medium 404. The processor may be part of, for example, a memory controller (such as memory controller 162 illustrated in FIG. 1A). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408, 410, 412 and 414 to save position of a wear level rotation. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, rotation start instructions 406, when executed by a processor (e.g., 402), may cause system 400 to start a start a current rotation of a wear level algorithm through a plurality of cache line addresses in a region of memory. The plurality may include a first cache line and an initial gap cache line. The wear level algorithm may alternate between an even rotation and an odd rotation. The even rotation may be characterized by a first value of the metadata and the odd rotation may be characterized by a second value of the metadata. The method may include setting the value of the metadata to the first value if the current rotation is the even rotation and setting the value of the metadata to second value if the current rotation is the odd rotation.

Location store instructions 408, when executed by a processor (e.g., 402), may cause system 400 to store a rotation count of the rotation, wherein the rotation count corresponds to a cache line address belonging to the plurality. Data move instructions 410, when executed by a processor (e.g., 402), may cause system 400 to move a cache line from the first cache line address to the initial gap cache line address corresponding to the additional cache line address. Metadata set instructions 412, when executed by a processor (e.g., 402), may cause system 400 to set a metadata of the initial gap cache line address to a value corresponding to the current rotation. The first cache line address may become a current gap cache line address after the data has been copied and the metadata has been set. Position determine instructions 414, when executed by a processor (e.g., 402), may cause system 400 to determine, based on the value of at least one metadata and the rotation count, a current position of the current rotation after a power loss event.

The foregoing disclosure describes a number of examples for saving position of a wear level rotation. The disclosed examples may include systems, devices, computer-readable storage media, and methods for saving position of a wear level rotation. For purposes of explanation, certain examples are described with reference to the components illustrated in FIGS. 1A-4. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1A-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A system comprising:
a wear level handler to start a current rotation of a wear level algorithm through a plurality of cache line addresses in a region of memory, wherein the wear level algorithm alternates between an even rotation and an odd rotation, the even rotation characterized by a first value of the metadata and the odd rotation characterized by a second value of the metadata;
a location storer to store a rotation count corresponding to a cache line address belonging to the plurality;
a data mover to move a cache line from a selected cache line address to a gap cache line address corresponding to an additional cache line address,
a metadata setter to:
set a metadata of the gap cache line address to a value corresponding to the current rotation, wherein the first cache line address becomes the current gap cache line address after the data has been copied and the metadata has been set,
set the value of the metadata to the first value if the current rotation is the even rotation,
set the value of the metadata to second value if the current rotation is the odd rotation; and
a current position determiner to determine, based on the value of at least one metadata and the rotation count, a current position of the current rotation after a power loss event.

2. The system of claim 1, wherein the rotation count indicates a number of complete rotations of the wear level algorithm, the system comprising:
the algorithm handler further to:
complete the current rotation through the plurality of cache lines,
start a second rotation through the plurality of cache lines; and
the location storer further to:
increment the rotation count, and
store the location of the rotation count.

3. The system of claim 1 comprising:
the current position determiner further to reconstruct a pointer using the rotation count and the metadata, wherein the pointer gap includes the location of the gap cache line.

4. The system of claim 1 comprising:
the metadata setter further to:
set a reference metadata of the cache line corresponding to the rotation count to the value corresponding to the current rotation; and
store the reference metadata with the location of the rotation count.

5. The system of claim 1, comprising
the current position determiner further to:
determine, after the power loss event, the value corresponding to the current rotation; and
determine the current position of the current rotation by identifying a first adjacent cache line containing a first metadata with the value corresponding to the current rotation and a second adjacent cache line containing a second metadata a value that does not correspond to the current rotation.

6. A method comprising:
starting a current rotation of a wear level algorithm through a plurality of cache line addresses in a region of memory, wherein the wear level algorithm alternates between an even rotation and an odd rotation, the even rotation characterized by a first value of the metadata and the odd rotation characterized by a second value of the metadata;
storing the rotation count of the current rotation, wherein a rotation count corresponds to a cache line address belonging to the plurality;
for each cache line in the plurality:
selecting the cache line address and moving the cache line from the selected address to a current gap address,
setting a metadata of the moved cache line to a value corresponding to the current rotation, wherein the selected cache line address becomes the current gap cache line address after the data has been copied and the metadata has been set;
setting the value of the metadata to the first value if the current rotation is the even rotation;
setting the value of the metadata to second value if the current rotation is the odd rotation; and
determining, based on the value of at least one metadata and the rotation count, a current position of the current rotation after a power loss event.

7. The method of claim 6, wherein the rotation count indicates a number of complete rotations of the wear level algorithm, the method comprising:
- completing the current rotation through the plurality of cache lines;
- starting a second rotation through the plurality of cache lines;
- incrementing the rotation count; and
- storing the location of the rotation count.

8. The method of claim 6,
- recognizing the power loss event, wherein a pointer including the location of the gap cache line is not saved upon recognition of the power loss event.

9. The method of claim 8 comprising:
- reconstructing the pointer using the rotation count and the metadata.

10. The method of claim 6, wherein the region of memory includes a plurality of sub regions, the method comprising:
- periodically storing a sub region rotation counter of a current subregion of the gap cache line, wherein the current sub region belongs to the plurality of sub regions;
- determining, after the power loss event, the sub-region containing the gap cache line based on the sub region rotation counter; and
- performing a binary search algorithm on the sub-region.

11. The method of claim 6 comprising:
- setting a reference metadata of the cache line corresponding to the rotation count to the value corresponding to the current rotation; and
- selecting a value for the reference metadata based on the rotation count.

12. The method of claim 6 comprising:
- determining, after the power loss event, the value corresponding to the current rotation;
- determining the current position of the current rotation by identifying a first adjacent cache line containing a first metadata with the value corresponding to the current rotation and a second adjacent cache line containing a second metadata a value that does not correspond to the current rotation.

13. A non-transitory machine-readable storage medium encoded with instructions, the instructions executable by a hardware processor of a system to cause the system to:
- start a current rotation of a wear level algorithm through a plurality of cache line addresses in a region of memory, wherein the plurality includes a first cache line address and an initial gap cache line address;
- store a rotation count of the rotation, wherein the rotation count corresponds to a cache line address belonging to the plurality;
- move a cache line from the first cache line address to the initial gap cache line address corresponding to an additional cache line address,
- set a metadata of the initial gap cache line address to a value corresponding to the current rotation, wherein the first cache line address becomes a current gap cache line address after the data has been copied and the metadata has been set;
- determine, based on the value of at least one metadata and the rotation count, a current position of the current rotation after a power loss event;
- store, at a time interval, a sub region rotation count for a current sub-region of the gap cache line, wherein the current sub region belongs to the plurality of sub regions;
- determine, after the power loss event, the current sub-region containing the gap cache line based on the sub region rotation count; and
- perform a binary search algorithm on the sub-region.

14. The non-transitory machine-readable storage medium of claim 13, wherein the instructions executable by the processor of the system further cause the system to:
- complete the current rotation through the plurality of cache lines;
- start a second rotation through the plurality of cache lines;
- increment the rotation count by changing the location of the rotation count to a subsequent cache line in the plurality;
- store the location of the rotation count.

15. The non-transitory machine-readable storage medium of claim 13, wherein the instructions executable by the processor of the system further cause the system to:
- recognize a power loss event, wherein a pointer including the location of the gap cache line is not saved upon recognition of the power loss event.

16. The non-transitory machine-readable storage medium of claim 13, wherein the instructions executable by the processor of the system further cause the system to:
- set a reference metadata of the cache line corresponding to the rotation count to the value corresponding to the current rotation; and
- store the reference metadata with the location of the rotation count.

17. The non-transitory machine-readable storage medium of claim 13, wherein the instructions executable by the processor of the system further cause the system to:
- determine, after the power loss event, the value corresponding to e current rotation; and
- determine the current position of the current rotation by identifying a first adjacent cache line containing a first metadata with the value corresponding to the current rotation and a second adjacent cache line containing a second metadata a value that does not correspond to the current rotation.

* * * * *